(12) United States Patent
Ishii et al.

(10) Patent No.: US 10,428,873 B2
(45) Date of Patent: Oct. 1, 2019

(54) IRON-COPPER-BASED OIL-IMPREGNATED SINTERED BEARING AND METHOD FOR MANUFACTURING SAME

(71) Applicant: Diamet Corporation, Niigata-shi (JP)

(72) Inventors: Yoshinari Ishii, Niigata (JP); Yasuhiro Tsukada, Niigata (JP); Tomoe Obata, Niigata (JP)

(73) Assignee: Diamet Corporation, Niigata-shi (JP)

( * ) Notice: Subject to any disclaimer, the term of this patent is extended or adjusted under 35 U.S.C. 154(b) by 0 days.

(21) Appl. No.: 16/302,551

(22) PCT Filed: Jul. 27, 2017

(86) PCT No.: PCT/JP2017/027339
§ 371 (c)(1),
(2) Date: Nov. 16, 2018

(87) PCT Pub. No.: WO2018/021501
PCT Pub. Date: Feb. 1, 2018

(65) Prior Publication Data
US 2019/0203770 A1    Jul. 4, 2019

(30) Foreign Application Priority Data

Jul. 29, 2016  (JP) ................... 2016-150516
Feb. 1, 2017   (JP) ................... 2017-017106

(51) Int. Cl.
*F16C 33/02*  (2006.01)
*F16C 33/12*  (2006.01)
(Continued)

(52) U.S. Cl.
CPC .......... *F16C 33/128* (2013.01); *C22C 38/002* (2013.01); *C22C 38/008* (2013.01);
(Continued)

(58) Field of Classification Search
CPC ......... C22C 38/02; C22C 38/06; C22C 38/12; F16C 33/104; F16C 33/128; F16C 33/145; F16C 2204/64; F16C 2204/66
See application file for complete search history.

(56) References Cited

U.S. PATENT DOCUMENTS

2013/0101244 A1    4/2013  Nishizawa et al.
2014/0314354 A1*  10/2014  Nishizawa ............ F16C 33/104
                                                              384/279
(Continued)

FOREIGN PATENT DOCUMENTS

GB    2333779 A    8/1999
JP    09-41069 A   2/1997
(Continued)

OTHER PUBLICATIONS

International Search Report dated Sep. 5, 2017 for the corresponding PCT Application No. PCT/JP2017/027339.

*Primary Examiner* — Phillip A Johnson
(74) *Attorney, Agent, or Firm* — Leason Ellis LLP

(57) ABSTRACT

A sintered bearing exhibits less of a hard iron alloy phase, and has an excellent wear resistance and cost performance under low-revolution and high-load use conditions; and a method for producing such a sintered bearing. The sintered bearing contains Cu: 10 to 55% by mass, Sn: 0.5 to 7% by mass, Zn: 0 to 4% by mass, P: 0 to 0.6% by mass, C: 0.5 to 4.5% by mass and a remainder composed of Fe and inevitable impurities. An area ratio of a free graphite dispersed in a metal matrix of the bearing is 5 to 35%; a porosity thereof is 16 to 25%; a hardness of an iron alloy phase in the matrix is Hv 65 to 200; and raw material powders employ at least one of a crystalline graphite powder and a flake graphite powder each having an average particle size of 10 to 100 μm.

5 Claims, 2 Drawing Sheets

(51) Int. Cl.
*C22C 38/16* (2006.01)
*C22C 38/00* (2006.01)
*F16C 33/10* (2006.01)
*F16C 33/14* (2006.01)
*B22F 3/11* (2006.01)
*B22F 1/00* (2006.01)
*B22F 5/10* (2006.01)

(52) U.S. Cl.
CPC ............ *C22C 38/16* (2013.01); *F16C 33/104* (2013.01); *F16C 33/145* (2013.01); *B22F 1/0011* (2013.01); *B22F 3/11* (2013.01); *B22F 5/106* (2013.01); *B22F 2301/35* (2013.01); *B22F 2304/10* (2013.01); *F16C 2204/60* (2013.01); *F16C 2380/26* (2013.01)

(56) References Cited

U.S. PATENT DOCUMENTS

| | | |
|---|---|---|
| 2015/0139847 A1 | 5/2015 | Ito et al. |
| 2015/0285300 A1* | 10/2015 | Ito ........................... C22C 38/16 |
| | | 384/279 |
| 2016/0223016 A1* | 8/2016 | Ito ........................... B22F 1/007 |
| 2016/0301279 A1* | 10/2016 | Ito ............................. B06B 1/16 |
| 2017/0283911 A1* | 10/2017 | Ishii ........................... B22F 1/00 |
| 2018/0051747 A1* | 2/2018 | Yamashita ............ C22C 38/008 |

FOREIGN PATENT DOCUMENTS

| | | |
|---|---|---|
| JP | 09-49062 A | 2/1997 |
| JP | 2003-221606 A | 8/2003 |
| JP | 2010-077474 A | 4/2010 |
| JP | 2013-92163 A | 5/2013 |
| JP | 2014-25527 A | 2/2014 |
| WO | WO-99/08012 A | 2/1999 |

* cited by examiner

IRON-COPPER-BASED OIL-IMPREGNATED SINTERED BEARING AND METHOD FOR MANUFACTURING SAME

CROSS-REFERENCE TO RELATED PATENT APPLICATIONS

This application is a U.S. National Phase Application under 35 U.S.C. § 371 of International Patent Application No. PCT/JP2017/027339, filed Jul. 27, 2017, and claims the benefit of Japanese Patent Applications No. 2016-150516, filed Jul. 29, 2016 and No. 2017-017106, filed Feb. 1, 2017, all of which are incorporated by reference herein in their entireties. The International Application was published in Japanese on Feb. 1, 2018 as International Publication No. WO/2018/021501 under PCT Article 21(2).

FIELD OF THE INVENTION

The present invention relates to an iron-copper-based oil-impregnated sintered bearing used under a low-revolution and high-load use condition such as that involving an output shaft of an electric motor of an automobile; and a method for producing this sintered bearing.

BACKGROUND OF THE INVENTION

In recent years, iron-copper-based oil-impregnated sintered bearings have been used also on output shafts of electric motors for automobiles. As such iron-copper-based oil-impregnated sintered bearing, those disclosed in, for example, Patent documents 1 and 3 are known. In the case of an automobile such as a minivan, power windows and wiper motors involving larger window glasses are operated with outputs higher than before, thus resulting in a higher load and surface pressure applied to a bearing of an output shaft. Further, there has been a problem that since the output shafts used in these motors are revolved at a low speed of 200 rpm or lower, an oil film unique to an oil-impregnated sintered bearing tends to be formed in an insufficient manner such that the wear resistance of the oil-impregnated sintered bearing is now at risk as the shaft and bearing slide against each other in the form of metal contact. In order to impart a lubricity to the iron-copper-based oil-impregnated sintered bearing under such sliding condition with a lesser oil lubrication effect, there has been known a technique of dispersing and distributing graphite in a bearing material. An iron-copper-based sintered bearing containing graphite is produced by press-molding a raw material powder(s) that has been mixed with a graphite powder; and then performing steps such as sintering, sizing and oil impregnation on a molded body obtained. However, since the material composition of the bearing is that of an iron-copper-based sintered alloy, an iron powder and a graphite powder react with each other during sintering such that a hard iron alloy phase can be formed easily. An iron-copper-based oil-impregnated sintered bearing having a hard alloy phase therein often damages a sliding partner shaft member and then undergoes wear itself due to the damaged shaft, under a sliding condition such as that involving an output shaft of an electric motor for an automobile. As a remedial measure, although a quenched steel member with a high hardness may be used as a shaft, a carbon steel shaft has been used for cost reduction.

Here, as a conventional technique for inhibiting a reaction between an iron powder and a graphite during sintering, there has been known a technique where a raw material powder is at first prepared by mixing an iron powder, 2.0 to 9.0% by mass of a flake copper powder with an average particle size of 20 to 150 μm and 1.5 to 3.7% by mass of a graphite powder with an average particle size of 40 to 80 μm; and then by performing sintering at a temperature of 950 to 1030° C., there will be formed in the bearing an iron alloy phase having ferrite at an area ratio of 20 to 85% and a remainder composed of pearlite (Patent document 2). However, since pearlite is a hard phase formed by the reaction of iron and graphite, a sliding partner shaft member cannot be sufficiently prevented from being damaged.

PRIOR ART DOCUMENT

Patent Document

Patent document 1: JP-A-2003-221606
Patent document 2: JP-A-2010-77474
Patent document 3: JP-A-2013-92163
Patent document 4: WO1999/008012

SUMMARY OF THE INVENTION

Problem to be Solved by the Invention

It is an object of the present invention to provide a novel iron-copper-based oil-impregnated sintered bearing exhibiting a less of a hard iron alloy phase, and having an excellent wear resistance and cost performance under a low-revolution and high-load use condition such as that involving an output shaft used in an electric motor of an automobile; and a method for producing such sintered bearing.

Means to Solve the Problem

The iron-copper-based oil-impregnated sintered bearing of the present invention contains:
  Cu: 10 to 55% by mass;
  Sn: 0.5 to 7% by mass;
  Zn: 0 to 4% by mass;
  P: 0 to 0.6% by mass;
  C: 0.5 to 4.5% by mass; and
  a remainder composed of Fe and inevitable impurities, wherein an area ratio of a free graphite dispersed in a metal matrix is 5 to 35%.
  Further, a porosity is 16 to 25%.
  Further, a hardness of an iron alloy phase in the matrix is Hv 65 to 200.
  The method for producing the iron-copper-based oil-impregnated sintered bearing of the present invention, includes:
  a step of obtaining a mixed powder by mixing raw material powders such that the mixed powder contains Cu: 10 to 55% by mass, Sn: 0.5 to 7% by mass, Zn: 0 to 4% by mass, P: 0 to 0.6% by mass, C: 0.5 to 4.5% by mass and a remainder composed of Fe and inevitable impurities;
  a step of obtaining a green compact by press-molding the mixed powder; and
  a step of obtaining a sintered body by sintering the green compact at a temperature within a range of 820 to 940° C., wherein
  the raw material powders employ at least one of a crystalline graphite powder and a flake graphite powder each having an average particle size of 10 to 100 μm, and an area ratio of a free graphite dispersed in a metal matrix of the iron-copper-based oil-impregnated sintered bearing is 5 to 35%.

Effects of the Invention

The iron-copper-based oil-impregnated sintered bearing of the present invention contains Cu: 10 to 55% by mass; Sn: 0.5 to 7% by mass; Zn: 0 to 4% by mass; P: 0 to 0.6% by mass; C: 0.5 to 4.5% by mass; and a remainder composed of Fe and inevitable impurities, in which an area ratio of a free graphite dispersed in a metal matrix is 5 to 35%. Therefore, the hardness of the iron alloy phase can be controlled in an appropriate range, and the bearing itself thus has an excellent wear resistance and cost performance under a low-revolution and high-load use condition such as that involving an output shaft used in an electric motor of an automobile.

The method for producing the iron-copper-based oil-impregnated sintered bearing includes a step of obtaining a mixed powder prepared by mixing raw material powders such that the mixed powder contains Cu: 10 to 55% by mass, Sn: 0.5 to 7% by mass, Zn: 0 to 4% by mass, P: 0 to 0.6% by mass, C: 0.5 to 4.5% by mass and a remainder composed of Fe and inevitable impurities, a step of obtaining a green compact by press-molding the mixed powder, and a step of obtaining a sintered body by sintering the green compact at a temperature within a range of 820 to 940° C., in which the raw material powders employ at least one of a crystalline graphite powder and a flake graphite powder each having an average particle size of 10 to 100 μm, and an area ratio of a free graphite dispersed in a metal matrix of the iron-copper-based oil-impregnated sintered bearing is 5 to 35%. Therefore, there can be produced an iron-copper-based oil-impregnated sintered bearing having an iron alloy phase whose hardness can be controlled in an appropriate range; and thus exhibiting an excellent wear resistance and cost performance under a low-revolution and high-load use condition such as that involving an output shaft used in an electric motor of an automobile.

BRIEF DESCRIPTION OF THE DRAWINGS

FIGS. 1A and 1B are explanatory diagrams graphically illustrating a color photograph of a bearing surface for the description of a method for measuring an area ratio of a free graphite, in which FIG. 1A shows a measurement state, and FIG. 1B shows a state where squares have been painted individually.

DETAILED DESCRIPTION OF THE INVENTION

Figure 1A:
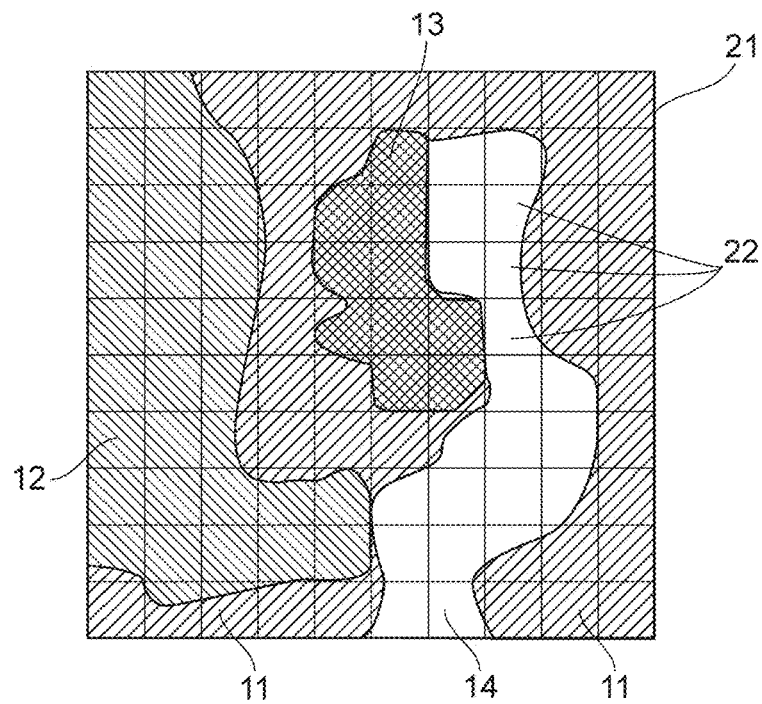

The iron-copper-based oil-impregnated sintered bearing of the present invention contains 10 to 55% by mass of Cu; 0.5 to 7% by mass of Sn; 0 to 4% by mass of Zn; 0 to 0.6% by mass of P; and 0.5 to 4.5% by mass of C; and a remainder composed of Fe and inevitable impurities, in which an area ratio of a free graphite dispersed in a metal matrix is 5 to 35%.

Although the graphite may be a natural graphite such as a crystalline graphite, a flake graphite and an amorphous graphite; or an artificial graphite, the iron-copper-based oil-impregnated sintered bearing of the present invention employs at least one of a natural crystalline graphite powder and flake graphite powder with a favorable crystallinity and an excellent lubricity, due to the fact that the lubricity of a graphite affects the degree of crystal growth. Further, in order to inhibit a sintering-induced reaction between iron and graphite in raw material powders, at least one of a crystalline graphite powder and a flake graphite powder each having an average particle size of 10 to 100 μm is used in the raw material powders of an iron-copper-based sintered alloy, and a sintering temperature is set to 820 to 940° C., thereby making it possible to secure a certain value of the area ratio of the free graphite dispersed in the metal matrix of a sintered body, and also control the hardness of an iron alloy phase.

Here, the average particle size of the graphite powder refers to a volume mean diameter MV as a value measured by a laser diffraction method.

The composition of the iron-copper-based oil-impregnated sintered bearing of the present invention is described in detail hereunder.

(1) Cu: 10 to 55% by Mass

Cu forms a solid solution together with Sn and P. Such Cu—Sn—P solid solution is softer than a sliding partner shaft, thereby improving a conformability with the sliding partner shaft, and thus contributing to an improvement in wear resistance of the bearing. When the amount of Cu contained is smaller than 10% by mass, there cannot be achieved the desired effects. Further, it is not preferable when the amount of Cu contained is larger than 55% by mass, because there will be exhibited an insufficient bearing strength such that bearing wear under a high load condition will be more significant.

(2) Sn: 0.5 to 7% by Mass

Sn forms a matrix solid solution together with Cu and P, and improves the strength of the bearing, thereby contributing to the improvement in wear resistance of the bearing. When the amount of Sn contained is smaller than 0.5% by mass, there cannot be achieved the desired effects. Further, it is not preferable when the amount of Sn contained is larger than 7% by mass, because there will be no effect in improving the strength, and a dimension accuracy will actually be impaired.

(3) Zn: 0 to 4% by Mass

Zn forms a matrix solid solution together with Cu and Sn, and has an effect of improving the corrosion resistance, conformability and strength of the bearing. When the amount of Zn contained is larger than 4% by mass, there will be no desired effect improvement. Thus, if Zn is added, it is preferred that it be added in an amount of not larger than 4% by mass.

(4) P: 0 to 0.6% by Mass

P is added in the form of a Cu—P alloy powder; and has an effect of yielding a liquid phase during sintering so as to promote sintering, and an effect of forming a matrix solid solution together with Cu and Sn so as to improve wear resistance. It is not preferable when the amount of P contained is larger than 0.6% by mass, because there will be no desired effect improvement, and a higher degree of deformation will actually be observed during sintering. Thus, if P is added, it is preferred that it be added in an amount of not larger than 0.6% by mass.

(5) C: 0.5 to 4.5% by Mass

When dispersed as a free graphite in the matrix of the bearing alloy, C imparts a superior lubricity to the bearing so as to contribute to the improvement in wear resistance and a reduction in friction coefficient. When the amount of C contained is smaller than 0.5% by mass, there cannot be achieved the effect of improving wear resistance. Further, it is not preferable when the amount of C contained is larger than 4.5% by mass, because strength will decrease significantly.

(6) Porosity: 16 to 25%

Pores, when dispersed in the matrix, have an effect of absorbing a strong friction against the bearing so as to inhibit wear of the bearing. However, such effect will be insufficient if the porosity is lower than 16%. Further, it is not preferable when the porosity is higher than 25%, because strength will decrease significantly.

(7) Crystalline Graphite Powder and Flake Graphite Powder

As a graphite powder(s) used in the raw material powders, there can be employed at least one of a crystalline graphite powder and a flake graphite powder. The crystalline graphite powder and flake graphite powder are to be dispersed and distributed as free graphite in the matrix of the bearing alloy, thereby imparting an excellent lubricity to the bearing, and thus contributing to the improvement in wear resistance and the reduction in friction coefficient. When the average particle size of the crystalline graphite powder or flake graphite powder is smaller than 10 μm, the above effects of the graphite powder cannot be achieved due to the fact that the hardness of the iron alloy phase will increase by a reaction between the graphite powder(s) and an iron powder in the raw material powders during sintering, and the fact that there will now be a lower area ratio of free graphite. Further, it is not preferable when such average particle size is larger than 100 μm, because strength will decrease significantly.

Described hereunder are specific working examples of the iron-copper-based oil-impregnated sintered bearing of the present invention and a method for producing the same. However, the invention is not limited to the following working examples. In fact, the invention may be carried out in various modified ways.

Working Examples

As raw material powders, there were prepared a reduced iron powder and an electrolytic copper powder for powder metallurgy; a flake copper powder; a Cu-9% by mass Sn powder; a Sn powder; a Cu-8% by mass P powder; a Cu-20% by mass Zn powder; and a graphite powder. As for a graphite powder among these powders, each of the working examples of the present invention used a crystalline graphite powder and/or flake graphite powder with a larger average particle size, whereas each of the comparative examples used an artificial graphite powder or crystalline graphite powder with a smaller average particle size.

These raw material powders were combined together in a way such that the final component composition(s) shown in Table 1 was met. Next, 0.5% of zinc stearate was added thereto, and a V-type mixer was then used to mix the components for 20 min so as to obtain a mixed powder. The mixed powder was then turned into a green compact by press molding, and this green compact was then sintered at a given temperature within a range of 820 to 940° C. under an endothermic gas atmosphere prepared by mixing a natural gas with air, and then passing the mixed gas through a heated catalyst so as to decompose and convert the gas. Thus, a sintered body was obtained. Sizing was then carried out at a given pressure, followed by impregnating the sized piece with a particular synthetic hydrocarbon-based lubricant oil, thereby obtaining ring-shaped test pieces in working examples 1 to 17 and comparative examples 1 to 8. These ring-shaped test pieces were iron-copper-based oil-impregnated sintered bearings each having a size of outer diameter: 18 mm×inner diameter: 8 mm×height: 8 mm; and the component composition(s) shown in Table 1 with a free graphite dispersed therein.

TABLE 1

| Bearing | | Composition of raw material powder (% by mass) | | | | | | | | | Average diameter of graphite powder(μm) |
|---|---|---|---|---|---|---|---|---|---|---|---|
| | | Cu powder | Cu flat powder | Fe powder | Cu—P powder | Cu—Sn powder | Sn powder | Cu—Zn powder | Graphite (C) powder | Total | |
| Working example of the invention | 1 | 5 | 5 | 86.5 | Cu—8%P: 0 | Cu—9%Sn: 0 | 0.5 | Cu—20%Zn: 0 | 3 | 100.0 | 20 |
| | 2 | 5 | 10 | 83 | Cu—8%P: 0 | Cu—9%Sn: 0 | 1 | Cu—20%Zn: 0 | 1 | 100.0 | 15 |
| | 3 | 10 | 10 | 77 | Cu—8%P: 0 | Cu—9%Sn: 0 | 1 | Cu—20%Zn: 0 | 2 | 100.0 | 10 |
| | 4 | 6.5 | 0 | 63.8 | Cu—8%P: 2.5 | Cu—9%Sn: 16.7 | 0 | Cu—20%Zn: 7.5 | 3 | 100.0 | 70 |
| | 5 | 0.4 | 5 | 73.6 | Cu—8%P: 5.0 | Cu—9%Sn: 11 | 3 | Cu—20%Zn: 0 | 2 | 100.0 | 85 |
| | 6 | 17.4 | 0 | 54.1 | Cu—8%P: 5.0 | Cu—9%Sn: 11 | 1 | Cu—20%Zn: 10 | 1.5 | 100.0 | 50 |
| | 7 | 18.3 | 0 | 48.2 | Cu—8%P: 3.75 | Cu—9%Sn: 16.7 | 1 | Cu—20%Zn: 10 | 2 | 100.0 | 70 |
| | 8 | 10.1 | 0 | 42.1 | Cu—8%P: 5.0 | Cu—9%Sn: 27.8 | 0 | Cu—20%Zn: 12.5 | 2.5 | 100.0 | 85 |
| | 9 | 7.8 | 10 | 36.4 | Cu—8%P: 7.5 | Cu—9%Sn: 33.3 | 3 | Cu—20%Zn: 0 | 2 | 100.0 | 50 |
| | 10 | 6.3 | 15 | 46.7 | Cu—8%P: 3.75 | Cu—9%Sn: 22.2 | 2 | Cu—20%Zn: 0 | 4 | 100.0 | 85 |
| | 11 | 6.2 | 10 | 48.6 | Cu—8%P: 5.0 | Cu—9%Sn: 22.2 | 1 | Cu—20%Zn: 5 | 2 | 100.0 | 50 |
| | 12 | 0 | 15.4 | 47.2 | Cu—8%P: 3.75 | Cu—9%Sn: 11.1 | 0 | Cu—20%Zn: 20 | 2.5 | 100.0 | 25 |
| | 13 | 13.3 | 0 | 46.2 | Cu—8%P: 3.75 | Cu—9%Sn: 22.2 | 0 | Cu—20%Zn: 10 | 4.5 | 100.0 | 95 |
| | 14 | 0 | 17 | 49.0 | Cu—8%P: 6.25 | Cu—9%Sn: 20.0 | 5.2 | Cu—20%Zn: 0 | 2.5 | 100.0 | 85 |
| | 15 | 12.5 | 20 | 46.5 | Cu—8%P: 5.0 | Cu—9%Sn: 0 | 3.5 | Cu—20%Zn: 0 | 2.5 | 100.0 | 70 |
| | 16 | 17 | 10 | 48.0 | Cu—8%P: 5.0 | Cu—9%Sn: 10 | 4 | Cu—20%Zn: 5 | 1 | 100.0 | 70 |
| | 17 | 12.3 | 10 | 48.6 | Cu—8%P: 5.0 | Cu—9%Sn: 11.1 | 1 | Cu—20%Zn: 10 | 2 | 100.0 | 85 |
| Comparative example | 1 | 7 | 0 | 89.5 | Cu—8%P: 0 | Cu—9%Sn: 0 | 0.5 | Cu—20%Zn: 0 | 3 | 100.0 | 50 |
| | 2 | 39.3 | 5 | 31.6 | Cu—8%P: 5.0 | Cu—9%Sn: 11.1 | 1 | Cu—20%Zn: 5 | 2 | 100.0 | 5 |
| | 3 | 18.5 | 5 | 49.2 | Cu—8%P: 3.75 | Cu—9%Sn: 0 | 0 | Cu—20%Zn: 20 | 3.5 | 100.0 | 10 |
| | 4 | 11.2 | 0 | 44.7 | Cu—8%P: 3.75 | Cu—9%Sn: 33.3 | 5 | Cu—20%Zn: 0 | 2 | 100.0 | 5 |
| | 5 | 19.5 | 0 | 41.7 | Cu—8%P: 3.75 | Cu—9%Sn: 0 | 3 | Cu—20%Zn: 30 | 2 | 100.0 | 10 |
| | 6 | 2.7 | 0 | 47 | Cu—8%P: 0 | Cu—9%Sn: 33.3 | 0 | Cu—20%Zn: 15 | 2 | 100.0 | 5 |
| | 7 | 4.3 | 0 | 53.7 | Cu—8%P: 3.75 | Cu—9%Sn: 22.2 | 1 | Cu—20%Zn: 15 | 0 | 100.0 | — |
| | 8 | 33.7 | 0 | 39.8 | Cu—8%P: 2.5 | Cu—9%Sn: 0 | 3 | Cu—20%Zn: 15 | 6 | 100.0 | 120 |

Wear test was performed on the ring-shaped oil-impregnated sintered bearing thus obtained, under a low-speed and high-load condition.

A S45C carbon steel shaft having an outer diameter of 8 mm was inserted into the ring-shaped oil-impregnated sintered bearing, followed by rotating the shaft at a rate of 5 m/min for 50 hours while applying a load of 100 kgf to the ring-shaped bearing from outside. Later, wear resistance evaluation was performed by measuring a maximum wear depth in the sliding receiving surface of the ring-shaped bearing; and a maximum wear depth in the sliding portion of the sliding partner shaft.

Figure 1B:
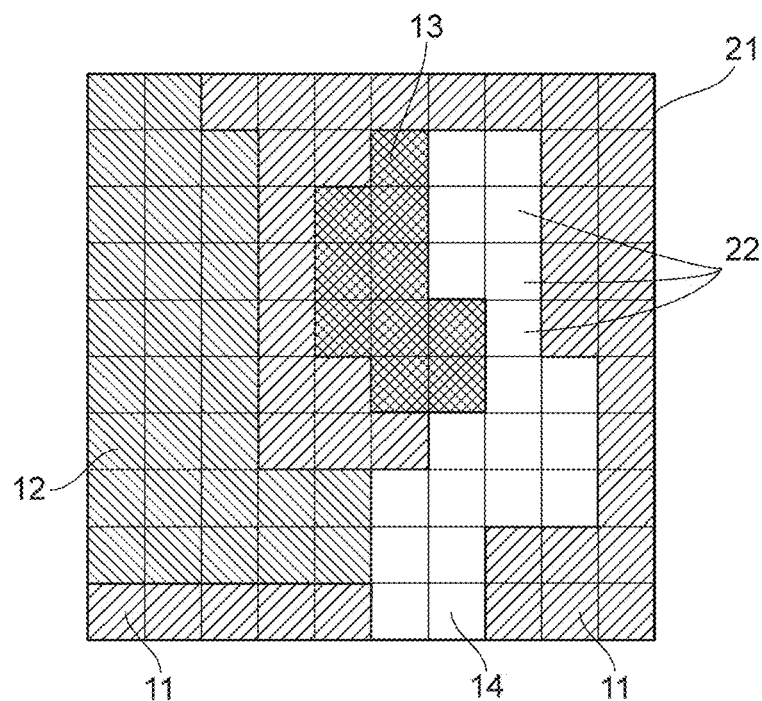

Table 2 shows the component composition of each sample; porosities; area ratios of the free graphite; hardness of the iron alloy phase in the matrix; and maximum wear depths in the bearing and sliding partner shafts that were observed after the wear test. Here, the hardness of the iron alloy phase in the matrix was measured as follows. That is, an abrasive operation was performed on an end face of the bearing to an extent that a metallic structure would eventually become visible. A Micro Vickers tester was then used to select and target the iron alloy phase, and then measure the hardness thereof at three points under a measuring load of 50 g. An average value was then obtained as the hardness of the iron alloy phase. The area ratio of the free graphite was calculated as follows.

composed of graphite; and a pore area 14 composed of pores. Squares 22 aligned in the longitudinal and transverse directions are formed in a given area of a frame 21 made of, for example, a transparent panel. In FIG. 1, the squares 22 are, for example, provided in a manner of: longitudinal 10×transverse 10. In each square 22, a type of area occupying the largest part thereof is counted as such corresponding area, and then calculated was the area ratio of the graphite area 13 on the surface excluding the pore area 14. For the sake of explanation, FIG. 1(B) is a diagram where the squares 22 are individually painted in accordance with the type of each area 11, 12, 13 and 14. For example, in FIG. 1(B), the numbers of the squares 22 counted as the copper area 11, iron area 12, graphite area 13 and pore area 14 are respectively 40, 30, 10 and 20. Here, since the area ratio of graphite refers to a ratio of areas occupied by the graphite area 13 excluding the pore area 14, the area ratio of graphite is 10/80×100=12.5%. Three parts on the inner diameter surface of the bearing were photographed, followed by calculating an average graphite area ratio via the method mentioned above.

Figure 2:
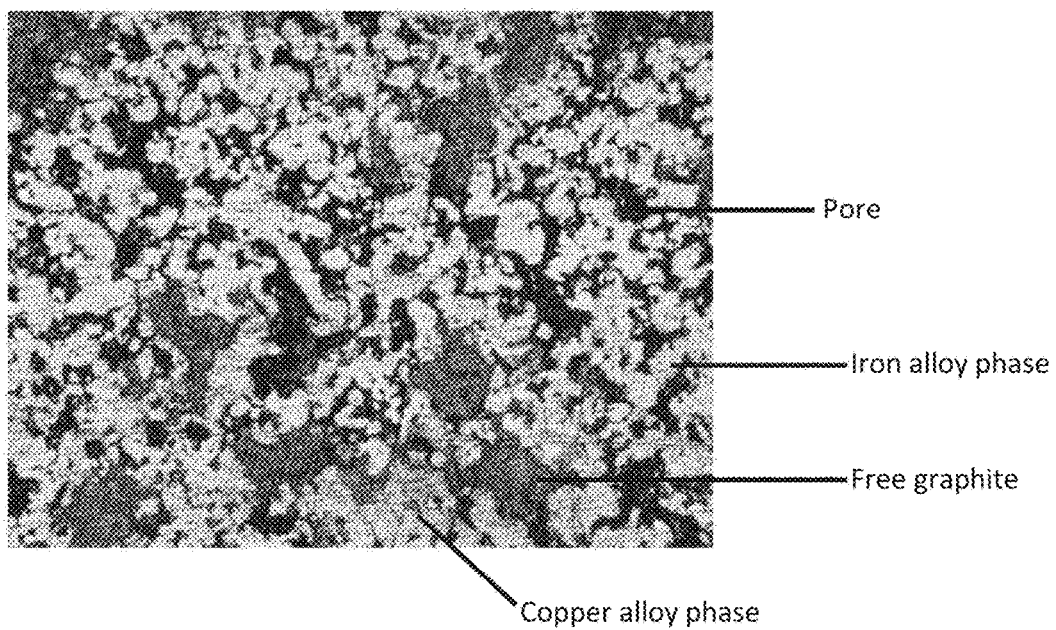
FIG. 2 is a photograph of an inner diameter surface of an iron-copper-based oil-impregnated sintered bearing of a working example in the present invention, the sintered bearing having a free graphite being dispersed and distributed therein.

As an example, FIG. 2 is a photograph of the inner diameter surface of an iron-copper-based oil-impregnated sintered bearing of a working example of the invention, with free graphite being dispersed and distributed therein.

TABLE 2

| Bearing | | Component composition (% by mass) | | | | | | Sintering temperature (° C.) | Area ratio of free graphite (%) | Porosity (%) | Radial crushing strength (MPa) | Hardness of iron phase (Hv0.05) | Maximum wear depth (μm) | |
|---|---|---|---|---|---|---|---|---|---|---|---|---|---|---|
| | | Cu | Sn | Zn | P | C | Fe | | | | | | Bearing | Counter Shaft |
| Working example of the invention | 1 | 10 | 0.5 | 0 | 0 | 3 | Remainder | 920 | 12.6 | 16 | 322 | 157 | 5 | 2 |
| | 2 | 15 | 1 | 0 | 0 | 1 | Remainder | 900 | 5 | 19 | 376 | 125 | 1 | 1 |
| | 3 | 20 | 1 | 0 | 0 | 2 | Remainder | 900 | 9.8 | 21 | 316 | 132 | 7 | 2 |
| | 4 | 30 | 1.5 | 1.5 | 0.2 | 3.0 | Remainder | 900 | 14.6 | 25 | 293 | 159 | 3 | 2 |
| | 5 | 20 | 4.0 | 0.0 | 0.4 | 2.1 | Remainder | 840 | 11.5 | 20 | 375 | 172 | 2 | 2 |
| | 6 | 40 | 2.0 | 2.0 | 0.4 | 1.5 | Remainder | 940 | 7.7 | 19 | 396 | 196 | 6 | 3 |
| | 7 | 45 | 2.5 | 2.0 | 0.3 | 2.0 | Remainder | 900 | 12.7 | 21 | 369 | 157 | 3 | 2 |
| | 8 | 50 | 2.5 | 2.5 | 0.4 | 2.5 | Remainder | 900 | 16.3 | 20 | 344 | 143 | 2 | 1 |
| | 9 | 55 | 6.4 | 0.0 | 0.6 | 1.9 | Remainder | 880 | 11.4 | 18 | 360 | 109 | 4 | 2 |
| | 10 | 45 | 4.0 | 0.0 | 0.3 | 4.0 | Remainder | 900 | 18.1 | 16 | 273 | 117 | 3 | 1 |
| | 11 | 45 | 3.2 | 1.0 | 0.4 | 2.1 | Remainder | 915 | 10.8 | 21 | 366 | 135 | 3 | 1 |
| | 12 | 45 | 1.0 | 4.0 | 0.3 | 2.5 | Remainder | 870 | 18.1 | 19 | 310 | 120 | 2.5 | 0.3 |
| | 13 | 45 | 2.0 | 2.0 | 0.3 | 4.5 | Remainder | 880 | 30.2 | 23 | 291 | 93 | 5 | 1 |
| | 14 | 41 | 6.9 | 0.0 | 0.5 | 2.4 | Remainder | 900 | 15.8 | 20 | 378 | 126 | 4 | 1 |
| | 15 | 45 | 3.5 | 2.0 | 0.4 | 2.5 | Remainder | 880 | 17.2 | 19 | 244 | 65 | 7 | 0.5 |
| | 16 | 45 | 5.1 | 1.0 | 0.4 | 0.9 | Remainder | 880 | 7.0 | 18 | 380 | 130 | 10 | 2 |
| | 17 | 45 | 2.0 | 2.0 | 0.4 | 2.5 | Remainder | 820 | 12.7 | 20 | 284 | 88 | 8 | 1 |
| Comparative example | 1 | 7 | 0.5 | 0.0 | 0.0 | 3.0 | Remainder | 980 | 2.1 | 29 | 305 | 331 | 377 | 32 |
| | 2 | 63 | 2.9 | 3.0 | 0.4 | 2.2 | Remainder | 820 | 5.8 | 15 | 190 | 91 | 567 | 9 |
| | 3 | 43 | 0.0 | 4.0 | 0.3 | 3.5 | Remainder | 920 | 10.3 | 20 | 217 | 246 | 36 | 12 |
| | 4 | 45 | 8.1 | 0.0 | 0.3 | 1.9 | Remainder | 940 | 5.8 | 22 | 380 | 280 | 246 | 15 |
| | 5 | 47 | 3.0 | 5.8 | 0.3 | 2.0 | Remainder | 930 | 6.7 | 21 | 419 | 277 | 482 | 24 |
| | 6 | 45 | 2.9 | 3.0 | 0.0 | 2.0 | Remainder | 920 | 6.3 | 25 | 255 | 239 | 558 | 11 |
| | 7 | 40 | 3.0 | 2.8 | 0.3 | 0.0 | Remainder | 860 | 0 | 18 | 374 | 58 | 526 | 51 |
| | 8 | 48 | 3.1 | 3.0 | 0.2 | 6.0 | Remainder | 940 | 36.8 | 22 | 114 | 216 | 461 | 3 |

A CCD camera was used to obtain a color photograph of the inner diameter surface of the bearing (at 100-fold magnification), followed by placing the frame of a given 2 mm grid tracing paper on top of the photograph, and then calculating the area ratio of the graphite parts. An example thereof is described with reference to FIG. 1. FIG. 1(A) is a diagram representing the color photograph of the surface of the bearing. Observed on such surface were a copper area 11 composed of copper or an copper alloy; an iron area 12 composed of iron or an iron alloy; a graphite area 13

As is clear from the test results regarding the maximum wear depths of the bearings and the sliding partner shafts, the bearings of the working examples of the present invention exhibited a superior wear resistance, and their sliding partner shafts exhibited less of wear, under the low-speed and high-load test condition, as compared to the bearings of the comparative examples.

The invention claimed is:

1. An iron-copper-based oil-impregnated sintered bearing comprising:

Cu: 10 to 55% by mass;
Sn: 0.5 to 7% by mass;
Zn: 0 to 4% by mass;
P: 0 to 0.6% by mass;
C: 0.5 to 4.5% by mass; and
a remainder composed of Fe and inevitable impurities, wherein an area ratio of a free graphite dispersed in a metal matrix is 5 to 35%.

2. The iron-copper-based oil-impregnated sintered bearing according to claim 1, wherein a porosity of the sintered bearing is 16 to 25%.

3. The iron-copper-based oil-impregnated sintered bearing according to claim 2, wherein a hardness of an iron alloy phase in the matrix is Hv 65 to 200.

4. The iron-copper-based oil-impregnated sintered bearing according to claim 1, wherein a hardness of an iron alloy phase in the matrix is Hv 65 to 200.

5. A method for producing an iron-copper-based oil-impregnated sintered bearing, comprising:

a step of obtaining a mixed powder by mixing raw material powders such that the mixed powder contains Cu: 10 to 55% by mass, Sn: 0.5 to 7% by mass, Zn: 0 to 4% by mass, P: 0 to 0.6% by mass, C: 0.5 to 4.5% by mass and a remainder composed of Fe and inevitable impurities;

a step of obtaining a green compact by press-molding the mixed powder; and a step of obtaining a sintered body by sintering the green compact at a temperature within a range of 820 to 940° C., wherein the raw material powders employ at least one of a crystalline graphite powder and a flake graphite powder each having an average particle size of 10 to 100 μm, and an area ratio of a free graphite dispersed in a metal matrix of the iron-copper-based oil-impregnated sintered bearing is 5 to 35%.

* * * * *